United States Patent [19]

Oudet et al.

[11] Patent Number: 5,532,585
[45] Date of Patent: Jul. 2, 1996

[54] POSITION SENSOR INCORPORATING A PERMANENT MAGNET AND A MAGNETISM-SENSITIVE PROBE AND INCLUDING PRIMARY AND SECONDARY AIR GAPS

[75] Inventors: Claude Oudet, Besancon; Daniel Prudham, Thise, both of France

[73] Assignee: Moving Magnet Technologies S.A., Besancon, France

[21] Appl. No.: 182,039

[22] PCT Filed: May 19, 1993

[86] PCT No.: PCT/FR93/00495

§ 371 Date: May 20, 1994

§ 102(e) Date: May 20, 1994

[87] PCT Pub. No.: WO93/23720

PCT Pub. Date: Nov. 25, 1993

[30] Foreign Application Priority Data

May 19, 1992 [FR] France .................... 92 06052

[51] Int. Cl.⁶ .............. G01B 7/14; G01D 5/14
[52] U.S. Cl. .............. 324/207.22; 324/207.2; 324/207.24
[58] Field of Search .......... 324/207.11, 207.13, 324/207.14, 207.15, 207.20, 207.21, 207.22, 207.23, 207.24, 207.25, 232, 235, 239, 260, 262

[56] References Cited

U.S. PATENT DOCUMENTS

| 3,194,990 | 7/1965 | Kendall | 324/207.2 |
|---|---|---|---|
| 4,338,823 | 7/1982 | Iwasaki | 324/207.16 X |
| 4,471,304 | 9/1984 | Wolf | 324/207.24 |
| 4,592,249 | 6/1986 | Lehmann et al. | 324/207.21 X |
| 4,793,241 | 12/1988 | Mano et al. | 324/207.24 X |
| 4,851,772 | 7/1989 | Acht et al. | 324/207.22 X |
| 4,985,652 | 1/1991 | Oudet et al. | |
| 5,003,363 | 3/1991 | Lachmann | 324/207.22 X |
| 5,041,785 | 8/1991 | Bogaerts et al. | 324/207.24 |
| 5,072,181 | 12/1991 | Burger | 324/207.2 X |
| 5,136,194 | 8/1992 | Oudet et al. | |
| 5,231,352 | 7/1993 | Huber | 324/207.22 X |
| 5,298,825 | 3/1994 | Oudet et al. | |
| 5,334,893 | 8/1994 | Oudet et al. | |
| 5,359,288 | 10/1994 | Riggs et al. | 324/207.22 |

FOREIGN PATENT DOCUMENTS

| 0120260 | 2/1984 | European Pat. Off. . |
|---|---|---|
| 0254207 | 7/1987 | European Pat. Off. . |
| 0338381 | 4/1989 | European Pat. Off. . |
| 2532981 | 2/1976 | Germany . |
| 2923644 | 12/1979 | Germany . |
| 2942873 | 4/1981 | Germany . |

OTHER PUBLICATIONS

Hencke, "Analoge Halbleiter–Hallsensoren", *CHIP Plus 5*, May 1989, pp. 20–22.
Paret, "Les Capteurs Magnéto–résistifs", *Electronique Radio Plans*, Jul. 1990, pp. 11–17.

*Primary Examiner*—Gerard R. Strecker
*Attorney, Agent, or Firm*—Oblon, Spivak, McClelland, Maier & Neustadt

[57] ABSTRACT

A position sensor which includes a stator presenting a slot forming a main air-gap inside which is positioned a permanent magnet, and including a sensor which features a magnetism-sensitive probe for measuring magnetic flow formed in a secondary air-gap. The permanent magnet is of a bipolar type and is movable inside the main thin air-gap delimited by ferromagnetic parts joined by non-magnetic connecting parts. The length of the main air-gap as measured along the direction of displacement of the movable magnet is at least 2(C+E), C designating the travel of the magnet and E designating the width of the main air-gap, the length of the magnet further being at least equal to (C+E) and its travel being at least ±C/2 with respect to the secondary air-gap perpendicular to the main air-gap.

9 Claims, 3 Drawing Sheets

POSITION SENSOR INCORPORATING A PERMANENT MAGNET AND A MAGNETISM-SENSITIVE PROBE AND INCLUDING PRIMARY AND SECONDARY AIR GAPS

BACKGROUND OF THE INVENTION

1. Field of the Invention

2. Discussion of the Background

The present invention concerns a position sensor incorporating a magnetism-sensitive probe designed to measure positions along a rectilinear trajectory. German Patent No. 2923644 describes a probe consisting of a ferromagnetic stator composed of two magnetically-insulated components. The stator has a longitudinal orifice forming the air gap, within which a permanent bipolar magnet can travel. The sensor according to prior art further comprises two magnetism-sensitive probes whose signals are transmitted to a differential amplifier.

SUMMARY OF THE INVENTION

The present invention is intended to propose a sensor allowing simplified manufacture and assembly and a high degree of reliability, and which transmits a quasi-linear signal.

To this end, the invention concerns, more particularly, a position sensor incorporating a permanent bipolar magnet mobile within a thin principal air gap delimited by the two ferromagnetic components.

The thickness of the permanent magnet is small in relation to the width of the poles as measured in the direction of travel, so that induction is substantially uniform for a given position along each of the poles of the stator separated by the slot in which the magnetism-sensitive probe is housed. The width of the magnet poles is typically at least six times greater than the thickness L of the magnet as measured in the direction of their magnetization.

The reversible permeability of the magnet approaches 1, and preferably, less than 1.2, in order to produce good response linearity.

The two ferromagnetic components are connected by non-magnetic connection elements. The length of the air gap measured in the direction of travel of the mobile magnet is at least 2(C+E), C being the course of travel of stroke of the magnet and E, the width of the air gap. The length of the magnet is at least equal to (C+E). The course of travel of stroke of the mobile magnet, which is magnetized in the direction of the width of the air gap, (+C/2)+(−C/2) in relation to a secondary air gap perpendicular to the main air gap and containing the magnetism-sensitive probe.

Production of a sensor of this kind is simple and economical, and it allows an advanced degree of miniaturization.

According to a preferred embodiment, the two ferromagnetic components are connected by non-magnetic lateral flanges made, for example, of brass. The ferromagnetic components are advantageously made of a 50/50 iron-nickel alloy.

According to an advantageous variant, the mobile magnet travels inside a fluid-tight tubular part placed between the ferromagnetic components. This variant makes it possible to produce a fluid-tight sensor for use in applications such as sensors designed for jack control valves.

The magnet is advantageously enclosed in a sheath of a material having a low coefficient of friction, such as Teflon.

In an embodiment comprising plane magnets, the width Z of these magnets as measured along the axis perpendicular to the direction of travel and to the direction of magnetization is greater than or equal to 3L, L being the length of the magnet as measured in the direction of its magnetization.

According to a variant embodiment of a fluid-tight linear sensor, the device according to the invention comprises a movable device consisting of a bearing incorporating, in its upper part, a clamp allowing coupling of a connection rod, this bearing having a cavity in which a first ferromagnetic component and a thin magnet are arranged, the second ferromagnetic component being placed adjacent to the outer surface of the bottom of a housing made of a non-magnetic material, the magnetism-sensitive probe being placed within a secondary air gap perpendicular to the direction of travel of the movable device.

According to a specific embodiment permitting a degree of unrestricted rotation of the connection rod, this connection rod comprises two stops and two springs arranged, respectively, between the rear stop and the rear surface of the clamp, and between the front stop and the front surface of the clamp.

BRIEF DESCRIPTION OF THE DRAWINGS

The invention will be better understood from a reading of the following description provided with reference to the drawings, in which.

DESCRIPTION OF THE PREFERRED EMBODIMENTS

Figure 1:
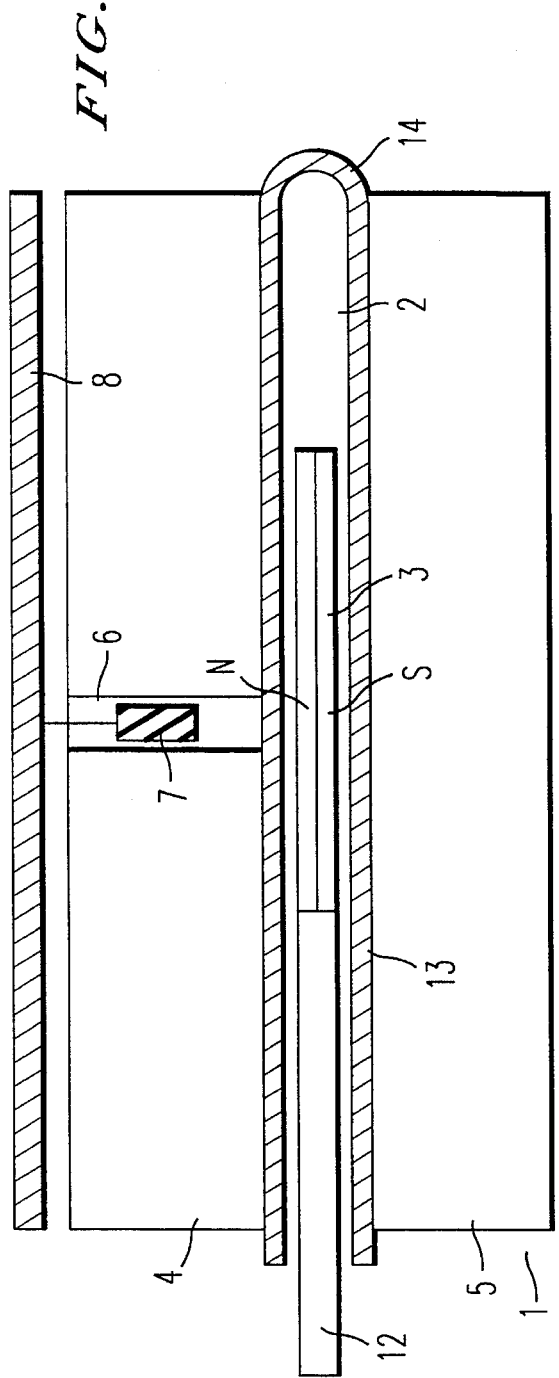
FIG. 1 is a longitudinal cross-section of a sensor according to the invention.
Figure 2:
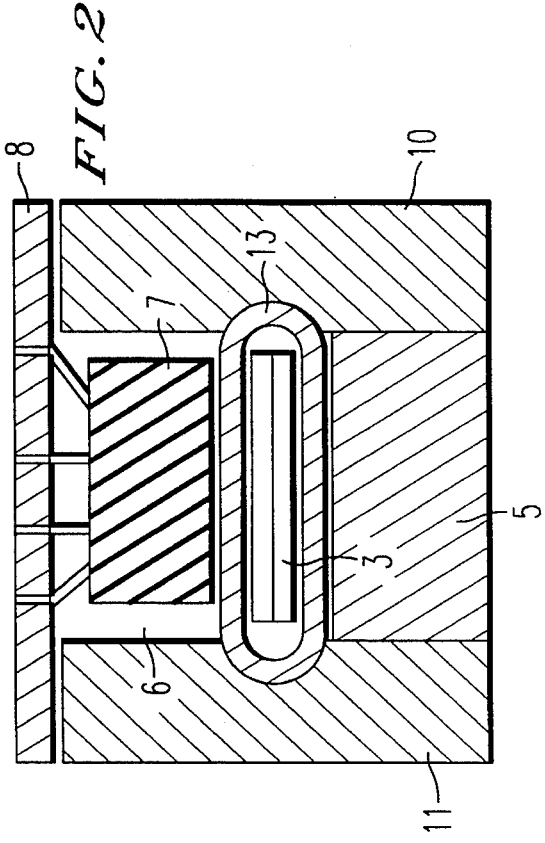
FIG. 2 is a view of the sensor in perpendicular cross-section.

The sensor according to the invention, shown in FIGS. 1 and 2 according to a scale 5, has a course of travel of stroke approximately 8 millimeters.

The sensor consists of a stator 1 incorporating an air gap 2, within which a thin magnet 3 is positioned.

The stator comprises an upper ferromagnetic component 4 and a lower, outer ferromagnetic component 5 made of a 50/50 iron-nickel alloy. The two ferromagnetic components 4, 5 together delimit a principal air gap 2 having a width of 3 millimeters. The term "width" refers to the dimension measured in the direction of magnetization of the magnet, which is perpendicular to the principal surface of the magnet.

The two ferromagnetic components 4, 5 are connected by two lateral brass flanges 10, 11.

One of the ferromagnetic components (in the example described, the upper ferromagnetic component 4) incorporates a secondary air gap 6 perpendicular to the principal air gap 2.

A magnetism-sensitive probe 7 is positioned in this secondary air gap 6, e.g., a magnetism-sensitive probe marketed by the Siemens Company under reference number KSY14.

It is mounted on a printed circuit 8 providing for electric connections with the components belonging to the amplification and output circuits.

The magnet 3 is, in the example described, of the samarium-cobalt Sm1Co5 type. It has a north pole facing the upper ferromagnetic component 4, and a south pole facing the ferromagnetic component 5. It is attached to a coupling mechanism 12 which provides for linkage with the part whose position is to be determined. In the example described, the magnet has a thickness of 1 millimeter and a length of 11 millimeters.

To ensure fluid-tightness between the part whose position is being measured and the sensor, a fluid-tight tube 13, sealed at the end 14 opposite the coupling mechanism 12, is placed in the air gap. The characteristics of this tube 13 are determined so as to allow it to withstand the pressure of the hydraulic fluid, in the case described corresponding to the measurement of the position of a valve-control actuator.

This fluid-tight tube 13 delimits an inner volume in which the magnet 3 travels.

Figure 3:
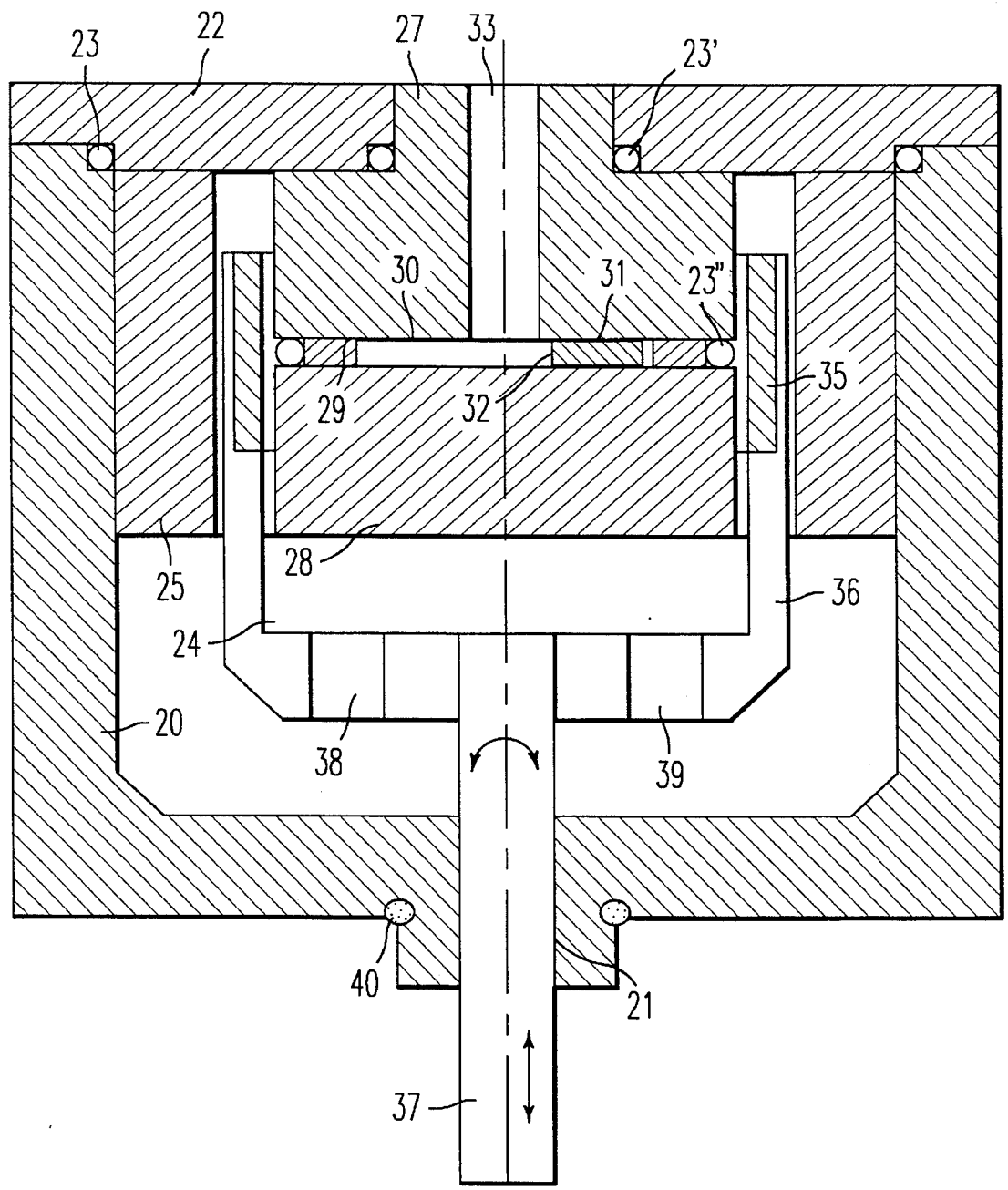
FIG. 3 is an axial cross-section of a cylindrical sensor.

FIG. 3 is a cross-section view of an embodiment of a cylindrical sensor incorporating axial geometry.

The sensor according to this embodiment comprises a rigid, fluid-tight cylindrical housing 20 having, in its lower part, a pin passage 21. It is made of a non-magnetic material which can withstand, if required, a pressure of 350 bars, for use in a position-measurement application covering electrovalves. The face opposite the pin passage 21 is sealed by a cover 22. O-ring sealing joints 23, 23', 23" ensure the fluid-tightness of the sensor.

The stator comprises a cylindrical inner ferromagnetic component 24 and a ring-shaped outer ferromagnetic component 25 made of a 50/50 iron-nickel alloy.

The two ferromagnetic components 24, 25 together delimit a principal ring-shaped air gap having a width of about 1 to 3 mm. The term "width" refers to the dimension measured along the direction of magnetization of the magnet, i.e., radially in the embodiment.

The outer ferromagnetic component 25 is attached to the housing 20.

The inner ferromagnetic component consists of two cylindrical parts 27, 28 made of a 50/50 iron-nickel alloy, which are coaxial, superposed on each other, and separated by a non-magnetic ring 29. An O-ring sealing joint 23" provides fluid-tightness. The two cylindrical parts 27, 28 together delimit a secondary air gap 30 whose height as determined by the thickness of the ring 29, i.e., from about 0.8 to 1 mm, is sufficient to house a magnetism-sensitive probe 31 placed in this air gap. The electric wires 32 belonging to the magnetism-sensitive probe 31 emerge from the sensor through an orifice 33 which is impermeable in relation to the inside of the housing 20.

The thin permanent magnet 35 is of the radial magnetization type, e.g., a magnet marketed by the Seiko Company under the trade name Samlet 9R. The length of the magnet 35 is preferably at most equal to the radius.

The permanent magnet can also consist of an assembly of tile-shaped magnets. e.g., three 120° tile-shaped magnets.

The magnet 35 is attached to a cylindrical base made of a non-magnetic material 36 and is attached to a connection pin 37 which passes through the bottom of the housing 20 through a passage 21, whether or not it is fluid-tight. In the embodiment illustrated in FIG. 3, the connection pin 37 can rotate axially without disrupting the measurement of axial travel.

In the case in which the pin passage 21 is not fluid-tight, circulation holes 38, 39 should be provided to allow the flow of air or fluid during the axial movements of the base 32 supporting the magnet 35.

An O-ring sealing joint 40 may potentially ensure fluid-tightness between the housing 20 of the sensor and the device to which it is connected.

Figure 4A:
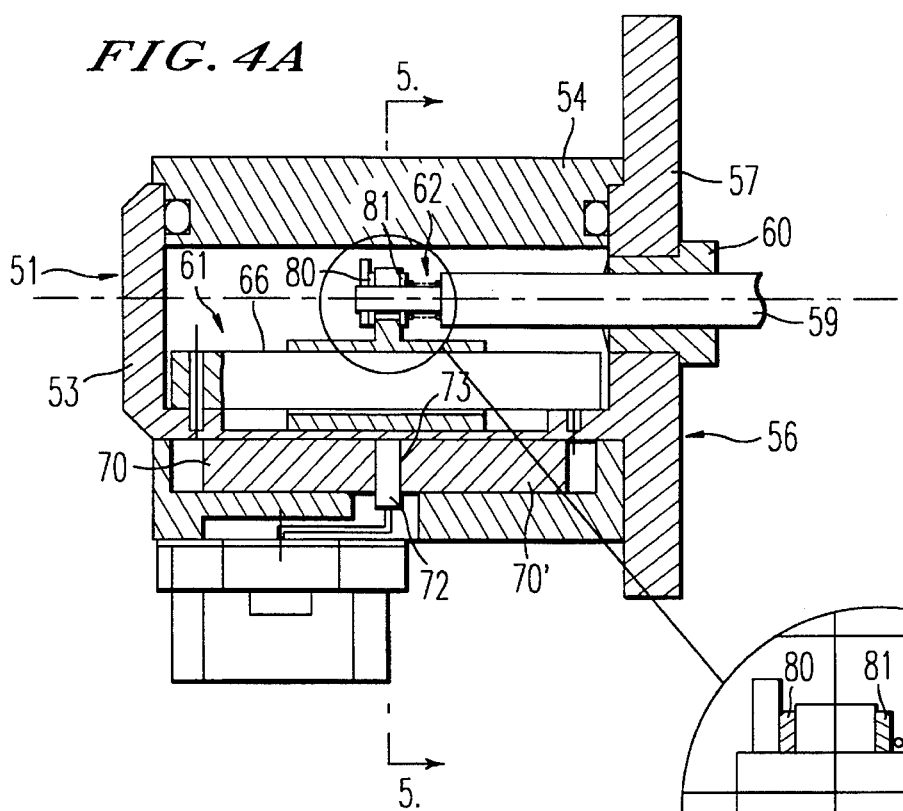
FIGS. 4a and 4b are is a cross-section view of a fluid-tight sensor according to the invention.
Figure 4B:
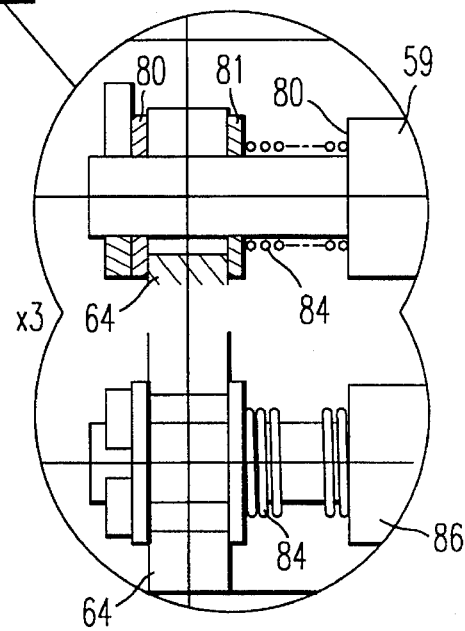
Figure 5:
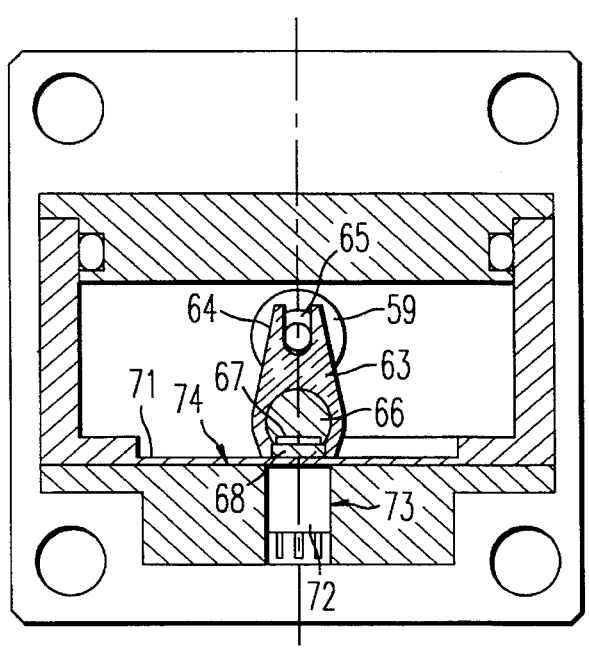
FIG. 5 is a view of the fluid-tight sensor in the cutting plane B—B.

FIGS. 4a, 4b and 5 show a variant embodiment of the linear sensor according to the invention, in two perpendicular cutting planes.

The sensor consists of a fluid-tight housing 51 made of a non-magnetic material, such as aluminum or an aluminum alloy. This housing incorporates a cylindrical cavity 52. The housing incorporates a lower part 53 which is sealed by a cover 54. An O-ring sealing joint 55 ensures the fluid-tightness of the housing. The front face 56 has an orifice 57 allowing passage of a connecting rod 59. A bearing 60 guides the connection rod 59 and restricts mechanical play. This bearing is not necessarily fluid-tight. The connection rod 59 functions in conjunction with the movable device 61 by means of a coupling device 61.

The movable device 61 consists of a bearing 63 made of a non-magnetic material, for example bronze, and incorporates a clamp 64 in its upper part. This clamp 64 has a U-shaped slot 65, which, while allowing a very small degree of play, is adjusted to the diameter of the end of the connection rod 59. The connection rod is fitted with two stops 80, 81 preventing axial play and allowing rotation of the connection rod 59 in relation to the movable device 62.

The link between the movable device 61 and the rod 59 is shown in FIG. 4b in three-fold magnification. A spring 84 is arranged between a shoulder 86 belonging to the connection rod 59 and the front stop 81. This spring 84 presses the stop 81 against the clamp 64 and thus prevents play in the direction of travel of the movable device 61. On the other hand, when the movable device 61 arrives at its end-of-travel, the spring makes it possible to limit mechanical stresses.

The lower part of the bronze bearing 63 incorporates a generally cylindrical cavity, in which a stationary soft iron part 66 constituting the first ferromagnetic component is inserted. This soft iron part has a flat surface 67 on its lower surface, parallel to the bottom of the housing. A thin magnet 68 is arranged in the lower part of the cavity. The length $L_{fa}$ of the soft iron part 66 is at least equal to the length $L_a$ of the magnet, to which is added the course of travel of the movable device 61. The magnet 68 is, in the example described, of the samarium-cobalt Sm1Co5 type. It has a north pole oriented toward the upper ferromagnetic part 66 and a south pole oriented toward the ferromagnetic components 70, 70', or vice-versa. It is attached in translational motion to the connection rod 59, thus ensuring linkage with the part whose position is to be determined. In the example described, the magnet has a thickness of 1 millimeter, and a length of 11 millimeters, The second ferromagnetic component consists of two soft iron parts 70, 70' incorporating a secondary air gap 73 and being adhesively bonded against the outer surface of the bottom 71 of the aluminum housing.

A magnetism-sensitive probe 72 is positioned within this secondary air gap, for example a magnetism-sensitive probe marketed by the Siemens Company under reference no. KSY14.

The principal air gap consists of the distance between the two elements 66 and 70, 70' made of soft iron. This distance encompasses the thickness of the bottom 71 of the housing, determined as a function of the pressures which the housing must withstand, and a space 74 formed between the upper surface of the magnet 68 and the flat part of the upper ferromagnetic component 66. The magnet 68 is unstably balanced between the two iron parts, and, because of this disequilibrium, the magnetic forces generated on it do not disturb the movement of the connection rod.

The bronze bearing 63 travels while sliding on the ferromagnetic component 66 and supports the permanent magnet 68.

The sensor according to the embodiment permits coupling with a device having a degree of unrestricted rotation, in addition to the degree of linear freedom in the direction of measurement.

The invention is specified in the foregoing description as a non-limiting example. It is obvious that the specialist will be able to conceive of variants in order to adapt it to the stresses generated in a particular application.

We claim:

1. A position sensor comprising:

first and second ferromagnetic components connected by at least one non-magnetic connection element, the first and second ferromagnetic components defining a principal air gap;

a permanent magnet formed to travel in the principal air gap;

a secondary air gap formed perpendicular to the principal air gap;

an induction measurement device including a magnetism sensitive probe formed in the secondary air gap; and wherein a length of the principal air gap as measured in a direction of the travel of the permanent magnet is at least equal to $2(C+E)$, where C is a course of travel of the permanent magnet and E is a width of the principal air gap, and a length of the permanent magnet is at least equal to $(C+E)$ and the course of travel of the permanent magnet is equal to $(+C/2)+(-C/2)$ relative to the secondary air gap.

2. The position sensor according to claims 1, wherein said two ferromagnetic components are connected by at least one non-magnetic lateral flange.

3. The position sensor according to claim 1, wherein said permanent magnet travels inside a fluid-tight tubular element.

4. The position sensor according to claim 1, wherein said permanent magnet is enclosed in a sheath of a material having a low coefficient of friction.

5. The position sensor according to claim 4, wherein the sheath of material is Teflon.

6. The position sensor according to claim 1, wherein a width Z of the permanent magnet as measured along an axis perpendicular to a direction of its magnetization is greater than or equal to 3L, where L is a length of the magnet as measured in the direction of its magnetization.

7. The position sensor according to any one of claims 1–4, wherein said permanent magnet is an annular magnet and can rotate freely.

8. The position sensor according to claim 1, further comprising a movable mechanism including a bearing incorporating on an upper part a clamp allowing coupling of a connection rod, said bearing sliding on the first ferromagnetic component incorporating a flat part and a cavity which positions the permanent magnet parallel to said flat part, said second ferromagnetic component being positioned adjacent to an outer surface of a bottom of a housing made of a non-magnetic material, said secondary air gap further being perpendicular to the direction of travel of said movable mechanism.

9. The position sensor according to claim 8, wherein said connection rod comprises two stops and a spring arranged respectively between the front stop and a shoulder belonging to the connection rod.

* * * * *